United States Patent
Kafuku et al.

(10) Patent No.: US 9,135,687 B2
(45) Date of Patent: Sep. 15, 2015

(54) THRESHOLD SETTING APPARATUS, THRESHOLD SETTING METHOD AND RECORDING MEDIUM IN WHICH PROGRAM FOR THRESHOLD SETTING METHOD IS STORED

(71) Applicant: CASIO COMPUTER CO., LTD., Shibuya-ku, Tokyo (JP)

(72) Inventors: Shigeru Kafuku, Akishima (JP); Keisuke Shimada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 56 days.

(21) Appl. No.: 14/051,250

(22) Filed: Oct. 10, 2013

(65) Prior Publication Data

US 2014/0133777 A1    May 15, 2014

(30) Foreign Application Priority Data

Nov. 15, 2012 (JP) ................................ 2012-250946

(51) Int. Cl.
*G06K 9/38* (2006.01)
*G06T 5/00* (2006.01)

(52) U.S. Cl.
CPC ....... *G06T 5/007* (2013.01); *G06T 2207/30201* (2013.01)

(58) Field of Classification Search
CPC .... G06K 9/0028; G06K 9/00234; G06T 3/00; G06T 11/00; H04N 1/403; H04N 1/405; H04N 1/40; H04N 1/4051; H04N 1/4074; H04N 5/23212; H04N 5/23219; H04N 5/23293; H04N 5/23296; H04N 5/2351; H04N 5/243
See application file for complete search history.

(56) References Cited

U.S. PATENT DOCUMENTS

| | | | | |
|---|---|---|---|---|
| 5,710,828 | A * | 1/1998 | Hashimoto | 382/172 |
| 8,294,795 | B2 * | 10/2012 | Muramatsu | 348/254 |
| 2009/0087041 | A1 * | 4/2009 | Hasebe et al. | 382/118 |
| 2010/0214449 | A1 * | 8/2010 | Shimizu | 348/240.2 |
| 2013/0108156 | A1 * | 5/2013 | Sakamaki | 382/167 |

FOREIGN PATENT DOCUMENTS

JP    2004-145625 A    5/2004

* cited by examiner

*Primary Examiner* — Jose Couso
(74) *Attorney, Agent, or Firm* — Holtz, Holtz, Goodman & Chick PC (57) ABSTRACT

Disclosed is a threshold setting apparatus including a creating unit which creates a plurality of images of tones by performing a tone conversion process on an original image including a subject by using a plurality of temporary thresholds which are different from each other, a subject detection unit which detects the subject in each of the plurality of images of tones which are created by the creating unit, an evaluation value calculating unit which calculates evaluation values relating to likeness to the subject from the plurality of subjects detected by the subject detection unit and associates the evaluation values with the temporary thresholds, and a setting unit which sets a threshold suited for the tone conversion of the original image based on the plurality of evaluation values calculated by the evaluation value calculating unit.

9 Claims, 7 Drawing Sheets

THRESHOLD SETTING APPARATUS, THRESHOLD SETTING METHOD AND RECORDING MEDIUM IN WHICH PROGRAM FOR THRESHOLD SETTING METHOD IS STORED

BACKGROUND OF THE INVENTION

1. Field of the Invention

The present invention relates to a threshold setting apparatus, a threshold setting method and a recording medium in which a program for the threshold setting method is stored.

2. Description of the Related Art

Conventionally, there is known a portrait creation apparatus which creates a portrait by using feature points of face components such as eyes, nose, mouth, ears and face contour (for example, see JP 2004-145625).

When a portrait is to be created, binarize process is performed on an original image. However, because black pixels in a face region increases more than normal when a person is wearing a pair of glasses with thick frame of dark color such as a pair of dark rimmed glasses, there is a problem that the face image itself cannot be binarized with an appropriate threshold.

SUMMARY OF THE INVENTION

In view of the above, an object of the present invention is to provide a threshold setting apparatus and a threshold setting method which can appropriately set a threshold for binarize process and a recording medium in which a program for the threshold setting method is stored.

According to an embodiment of the present invention, there is provided a threshold setting apparatus including a creating unit which creates a plurality of images of tones by performing a tone conversion process on an original image including a subject by using a plurality of temporary thresholds which are different from each other, a subject detection unit which detects the subject in each of the plurality of images of tones which are created by the creating unit, an evaluation value calculating unit which calculates evaluation values relating to likeness to the subject from the plurality of subjects detected by the subject detection unit and associates the evaluation values with the temporary thresholds, and a setting unit which sets a threshold suited for the tone conversion of the original image based on the plurality of evaluation values calculated by the evaluation value calculating unit.

According to an embodiment of the present invention, there is provided a threshold setting method using a threshold setting apparatus including creating a plurality of images of tones by performing a tone conversion process on an original image including a subject by using a plurality of temporary thresholds which are different from each other, detecting the subject in each of the plurality of created images of tones, calculating evaluation values relating to likeness to the subject from the plurality of detected subjects and associating the evaluation values with the temporary thresholds, and setting a threshold suited for the tone conversion of the original image based on the plurality of calculated evaluation values.

According to an embodiment of the present invention, there is provided a non-transitory computer readable recording medium having a program stored thereon that can be read by a computer in a threshold setting apparatus, the program making the computer function as a creating unit which creates a plurality of images of tones by performing a tone conversion process on an original image including a subject by using a plurality of temporary thresholds which are different from each other, a subject detection unit which detects the subject in each of the plurality of images of tones which are created by the creating unit, an evaluation value calculating unit which calculates evaluation values relating to likeness to the subject from the plurality of subjects detected by the subject detection unit and associates the evaluation values with the temporary thresholds, and a setting unit which sets a threshold suited for the tone conversion of the original image based on the plurality of evaluation values calculated by the evaluation value calculating unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Hereinafter, a specific embodiment of the present invention will be described with reference to the drawings. However, the scope of the present invention is not limited to the examples shown in the drawings.

Figure 1:
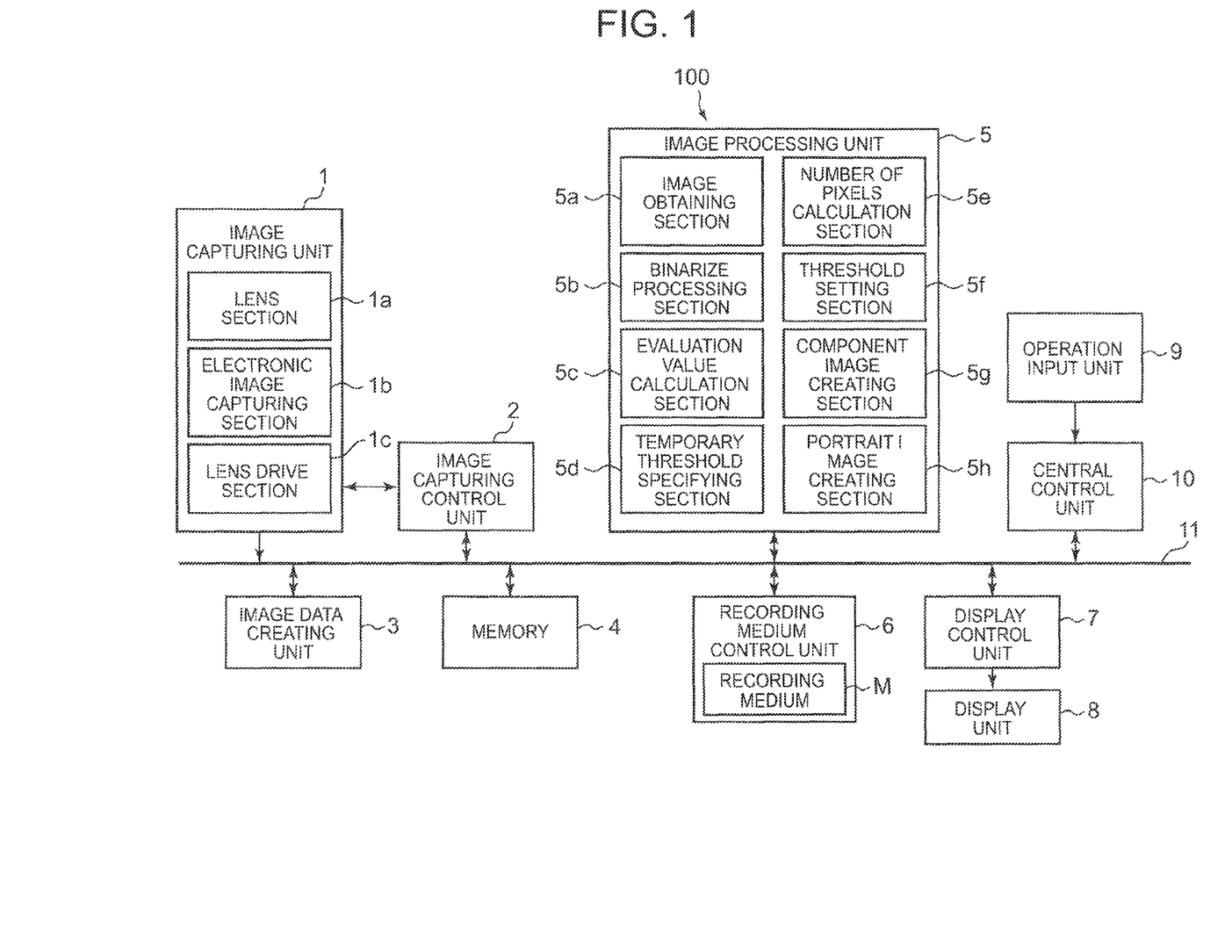
FIG. 1 is a block diagram showing a schematic configuration of an image capturing apparatus of the first embodiment where the present invention is applied.

FIG. 1 is a block diagram showing a schematic configuration of the image capturing apparatus 100 according to the first embodiment where the present invention is applied.

As shown in FIG. 1, the image capturing apparatus 100 of the embodiment includes an image capturing unit 1, an image capturing control unit 2, an image data creating unit 3, a memory 4, an image processing unit 5, a recording medium control unit 6, a display control unit 7, a display unit 8, an operation input unit 9, a central control unit 10 and such like, in particular.

The image capturing unit 1, the image capturing control unit 2, the image data creating unit 3, the memory 4, the image processing unit 5, the recording medium control unit 9, the display control unit 7 and the central control unit 10 are connected with one another via the bus line 11.

The image capturing unit 1 creates a frame image by capturing a specific subject.

In particular, the image capturing unit 1 includes a lens section 1a, an electronic image capturing section 1b and a lens drive section 1c.

The lens section 1a is constituted of a plurality of lenses such as a zoom lens and a focus lens, for example.

The electronic image capturing section 1b is constituted of an image sensor (image capturing element) such as a CCD (Charged Coupled Device) or a CMOS (Complementary Metal-oxide Semiconductor), for example. Further, the electronic image capturing section 1b converts the optical image which passed various lenses of the lens section 1a into a two dimensional image signal.

The lens drive section is includes a zoom drive unit which moves the zoom lens in the optical axis direction and a focus drive unit which moves the focus lens in the optical axis direction, for example, although they are omitted in the drawings.

Here, in addition to the lens section 1a, the electronic image capturing section 1b and the lens drive section 1c, the image capturing unit 1 may include a diaphragm (not shown in the drawing) which adjusts the light amount that passes through the lens section 1a.

The image capturing control unit 2 controls the image capturing of a specific subject by the image capturing unit 1. That is, although omitted in the drawings, the image capturing control unit 2 includes a timing generator, a driver and the like. The image capturing control unit 2 scan drives the electronic image capturing section 1b by the timing generator and the driver, converts the optical image which passed through the lens section 1a into a two dimensional image signal every predetermined cycle by the electronic image capturing section 1b, reads out frame images, one by one, forms the image capturing region of the electronic image capturing section 1b and outputs the read frame images to the image data creating unit 3.

Here, the image capturing control unit 2 may adjust the focus position of the lens section 1a by moving the electronic image capturing section 1b in the optical axis direction instead of the focus lens of the lens section 1a.

Further, the image capturing control unit 2 may carry out an adjustment control which is a condition for capturing an image of a specific subject in such as AF (automatic focus processing), AE (automatic exposure processing), AWB (automatic white balance) or the like.

After the image data creating unit 3 performs an arbitrary gain adjustment on each of the color components of RGB with respect to a signal of analog value of a frame image transmitted from the electric image capturing section 1b, the image data creating unit 3 converts the signal of analog value into digital data by the A/D converter (not shown in the drawing) by performing sample holding on the signal of analog value by a sample holding circuit (not shown in the drawing), performs color processing including pixel interpolation and γ correction on the digital data by the color processing circuit (not shown in the drawing), and then, generates the luminance signal Y and the color difference signals Cb, Cr (YUV data) of the digital value.

The brightness signal Y and the color difference signal Cb, Cr which are output from the color processing circuit are transmitted to the memory 4, which is used as a buffer memory, through DMA transmission via the DMA controller (not shown in the drawing).

The memory 4 is constituted of a DRAM (Dynamic Random Access Memory) or the like, for example, and in the memory 4, data and the like which are processed by the image processing unit 5, the central control unit 10 and the like are temporarily stored.

The image processing unit 5 includes an image obtaining section 5a, a binarize processing section 5b, an evaluation value calculation section 5c, a temporary threshold specifying section 5d, a number of pixels calculation section 5e, a threshold setting section 5f, a component image creating section 5g and a portrait image creating section 5h.

Each section in the image processing unit 5 is constituted of a predetermined logic circuit, for example. However, such configuration is an example and is not limitative in any way.

The image obtaining section 5a obtains an image which is the processing target in the threshold setting process.

Figure 4A:
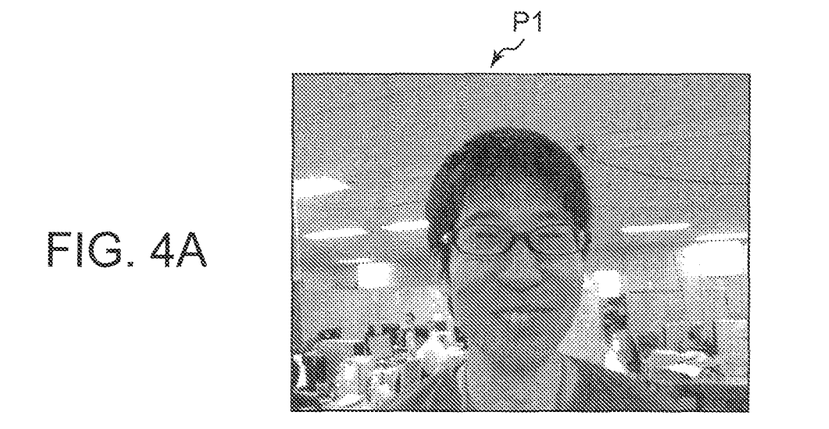
FIG. 4A is a schematic diagram showing an example of an image according to the threshold setting process of FIG. 3.

That is, the image obtaining section 5a obtains image data of the original image P1 (for example, a photograph image or the like). In particular, the image obtaining section 5a obtains a copy of image data (RGB data or YUV data) of the original image P1 which is created by the image data creating unit 3 by the image capturing unit 1 and the image capturing control unit 2 capturing an image of a specific subject (for example, the face of a person) or obtains a copy of image data of the original image P1 which is recorded in the recording medium M (see FIG. 4A).

Here, the after-mentioned processes of the image processing unit 5 may be performed with respect to the image data of the original image P1 itself or may be performed with respect to image data of a predetermined size (for example, VGA size or the like) where the image data of the original image P1 is reduced at a predetermined ratio as needed.

The following description is given assuming that the image data of the original image P1 is the image data expressing the pixel value of each pixel (for example, the brightness value) in 8 bit (265 tones).

The binarize processing section 5b performs a binarize process on the original image P1.

Figure 7A:
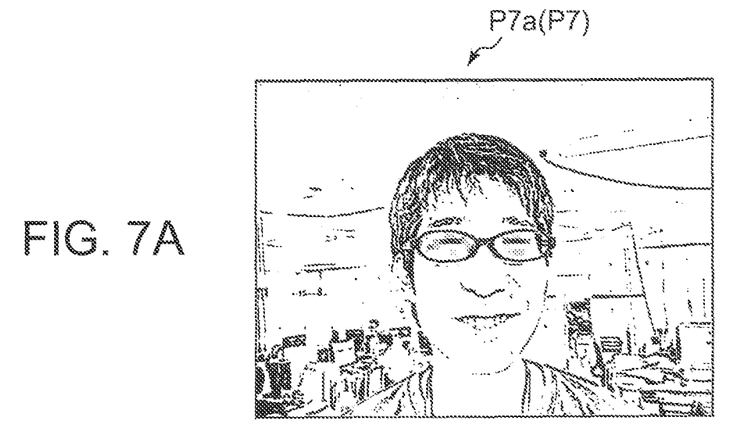
FIG. 7A is a schematic diagram showing an example of an image according to the threshold setting process of FIG. 3.
Figure 7B:
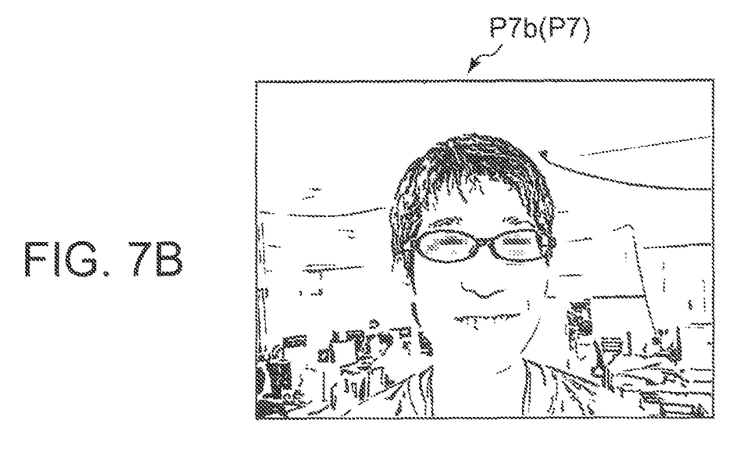
FIG. 7B is a schematic diagram showing an example of an image according to the threshold setting process of FIG. 3.

That is, the binarize processing section 5b performs the binarize process (a tone conversion process) with a plurality of temporary thresholds, which are different from each other, on the original image P1 obtained by the image obtaining section 5a and creates a plurality of binarized images (images of tones) P7 (for example, the binarized image P7a; see FIG. 7A). In particular, for example, if the brightness component data (Y data) of the original image P1, which is the processing target, is data where the brightness value of each pixel is expressed in 8 bit (256 tones), the binarize processing section 5b sequentially sets the temporary thresholds by varying (increasing or decreasing) the value in increments of a predetermined value (+2) within a predetermined range (for example, 231 to 255). Then, the binarize processing section 5b compares each of the sequentially set temporary thresholds (a series of temporary thresholds) to the brightness value of each pixel in the image data of the original image P1 to binarize the image data of the original image P1. In such way, the binarize processing section 5b creates a binarized image P7 having the first pixel values (for example, "0" corresponding to white pixels in FIG. 7A and the like) and the second pixel values (for example, "255" corresponding to black pixels in FIG. 7A and the like) for each temporary threshold. FIG. 7A schematically shows the binarized image P7a which is created by performing the binarize process with relatively low temporary threshold. FIG. 7B schematically shows the binarized image P7b which is created by performing the binarize process with relatively high temporary threshold.

Here, the binarize processing section 5b may perform the binarize process with respect to the image data of the original image P1 itself, the original image P1 being obtained by the image obtaining section 5a, or may perform the binarize process with respect to the image data on which various processes such as the anisotropic diffusion process and the blurring process are performed.

As a tone conversion process, the binarize process is exemplified. However, the binarize process is an example and is not limitative in any way, and the number of tones in the image to be created by performing the tone conversion process on the original image P1 can be changed arbitrarily.

The evaluation value calculation section 5c calculates evaluation values relating to likeness to the specific subject included in the binarized images P7.

That is, the evaluation value calculation section 5c detects the specific subject (for example, the face of a person) by performing the subject detection process (for example, the face detection process) with respect to each of the plurality of binarized images P7 which are created by the binarize processing section 5b. Further, the evaluation value calculation section 5c calculates a plurality of evaluation values relating to likeness to the specific subject in association with the temporary thresholds.

In particular, the evaluation value calculation section 5c performs the face detection process using a predetermined algorithm with respect to each of the binarized images P7. For example, every time the binarized image P7 is created by the binarize processing section 5b, the evaluation value calculation section 5c sets the created binarized image P7 as the processing target and creates a plurality of detection candidate regions of a predetermined size (for example, 24×24 [pixels]) as candidate regions for the face region. The evaluation value calculation section 5c also calculates the level of similarity between the image data of each detection candidate region and the image data of the predetermined reference image according to a predetermined algorithm (for example, adaboost). Then, the evaluation value calculation section 5c integrates the levels of similarity of the detection candidate regions whose calculated levels of similarity are equal to or greater than a predetermined threshold and calculates the outcome as the evaluation value. Further, the evaluation value calculation section 5c integrates the detection candidate regions and detects it as the face regions of the binarized image P7 which is the processing target.

Here, the predetermined reference image may be an image which is learned by using multivalued image data or may be an image which is learned by using binary image data. When the face detection process is to be performed by setting a binarized image P7 as the processing target, detection accuracy of the face region can be improved when binary image data is used comparing to when multivalued image data is used.

The evaluation value calculation section 5c calculates a plurality of evaluation values relating to the similarity to the specific subject in association with the temporary thresholds by performing the above process with respect to the individual binarized images P7 respectively corresponding to the threshold values which are in series. The calculated evaluation values are temporarily stored in the evaluation value table T (see FIG. 6) in a predetermined storage unit in association with the temporary thresholds.

Figure 6:
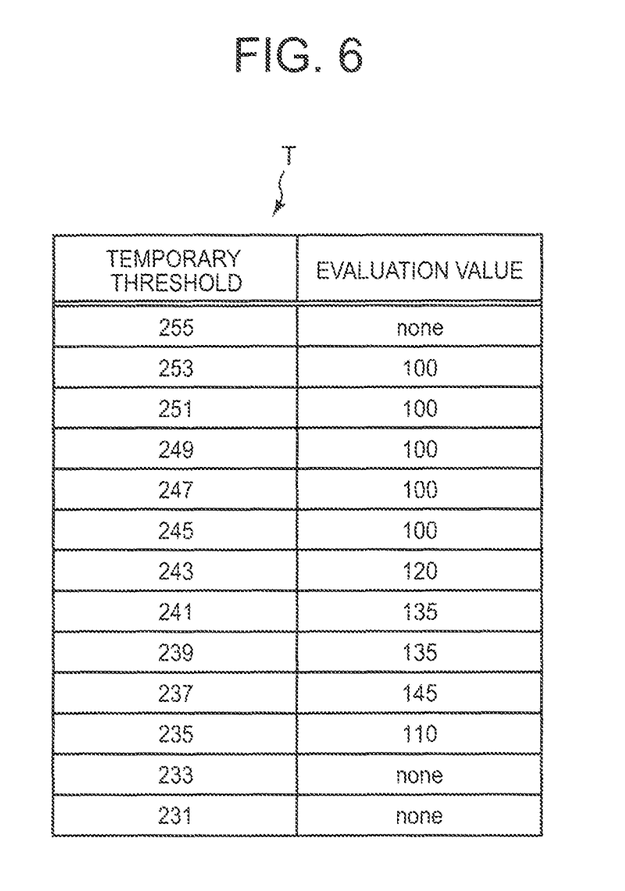
FIG. 6 is a schematic diagram showing an example of a table indicating evaluation values according to the threshold setting process of FIG. 3.

The evaluation value table T shown in FIG. 6 schematically shows a state where the temporary thresholds which are in series according to the binarized images P7 and the evaluation values for the face detection process are associated to each other. With respect to the evaluation values, the greater the value, the higher the level of similarity, and "none" indicates that the face region was not detected.

Here, the face detection process detecting the face of a person (the specific subject) in the binarized images P7 is exemplified as a subject detection process. However, this is an example and is not limitative in any way. The process can be arbitrarily modified.

The temporary threshold specifying section 5d specifies the minimum temporary threshold.

That is, the temporary threshold specifying section 5d specifies the minimum temporary threshold among the plurality of temporary thresholds which are associated with a plurality of evaluation values that are approximately the same value and continue for a predetermined number of times or more, the evaluation values being calculated by the evaluation value calculation section 5c. In particular, the temporary threshold specifying section 5d, for example, refers to the evaluation value table T and specifies the evaluation values (for example, "100") that are approximately the same value and continue for a predetermined number of times or more in the plurality of evaluation values which are calculated by the evaluation value calculation section 5c in association with the temporary thresholds that are in series. Then, the temporary threshold specifying section 5d specifies the minimum temporary threshold (for example, "245") among the plurality of temporary thresholds (for example, "245", "247", "249", "251", "253") which are associated with the specified evaluation values.

The number of pixels calculation section 5e calculates the number of pixels having predetermined pixel values in the region at the approximately center of the subject region which is detected in each binarized image P7.

That is, the number of pixels calculation section 5e calculates the number of pixels having a predetermined pixel values in the region at the approximately center of the subject region (face region) including the specific subject detected by the subject detection process in each of the plurality of binarized images P7. In particular, the number of pixels calculation section 5e sets the image where the noise elimination process is performed as the processing target, the group of pixels having the second pixel value (black pixels) of a predetermine number of less being eliminated as noise in the binarized image P7, for example, and sets the processing region such as a range where a predetermined size, for example, the region of Y direction (below eye brows and above mouth) X X direction (outsides of both eyes) in the extracted face region, is normalized at the approximately center of the face region detected in the corresponding binarized image P7. Then, the number of pixels calculation section 5e calculates the number of black pixels in the processing region.

The threshold setting section 5f sets the threshold suited for the binarize process of the original image P1.

That is, the threshold setting section 5f sets the threshold suited for the binarize process of the original image P1 based on the plurality of evaluation values which are calculated by the evaluation value calculation section 5c in associated with the temporary thresholds. In particular, the threshold setting section 5f sets the threshold suited for the binarize process of the original image P1 based on the minimum temporary threshold (for example, "245") which is specified by the temporary threshold specifying section 5d. At this time, the threshold setting section 5f may set the temporary threshold which is associated with the evaluation value which is higher than the evaluation value associated with the minimum temporary threshold specified by the temporary threshold specifying section 5d by a predetermined value or more as the threshold suited for the binarize process of the original image P1. That is, in order to reduce the threshold by a predetermined value (for example, about "8") with the minimum temporary threshold (for example "245") being the reference, the threshold setting section 5f specifies the temporary threshold associated with the evaluation value which is higher than the evaluation value (for example, "237") associated with the minimum temporary threshold by a predetermined value or more (for example, about "40") and set the specified temporary threshold as the threshold suited for the binarize process of the original image P1.

The threshold setting section 5f may set the threshold suited for the binarize process of the original image P1 based on the minimum temporary threshold which is specified by the temporary threshold specifying section 5d so that the number of pixels calculated by the number of pixels calculation section 5e be within a predetermined range. That is, in order to reduce the threshold by a predetermined value (for example, about "8") with the minimum temporary threshold (for example, "245") being the reference, the threshold setting section 5f specifies the binarized image P7 whose number of black pixels in the processing region at the approximate center of the face region is within a predetermined range (for example, about 3000 to 5000) and sets the temporary threshold used when generating this binarized image P7 as the threshold suited for the binarize process of the original image P1.

Here, the threshold setting section 5f may specify the temporary threshold (for example, "237") associated with the evaluation value which is higher than the evaluation value associated with the minimum temporary threshold by a predetermined value or more (for example, about "40") and may determine whether the number of black pixels in the processing region at the approximately center of the face region of the binarized image P7 which is binarized with the specified temporary threshold is within a predetermine range (for example, about 3000 to 5000).

The component image creating section 5g creates a face component image expressing main face components of a face.

That is, the component image creating section 5g creates a face component image (not shown in the drawings) of main components of the face in the original image P1 by using the binarized image P7 which is formed by the binarize process being performed on the original image P1 obtained by the image obtaining section 5a with the threshold set by the threshold setting section 5f. In particular, the component image creating section 5g performs the detail extraction processing with respect to the face region detected in the binarized image P7 which is formed by performing the binarize process on the original image P1 with the set threshold and creates the face detail image (not shown in the drawings) which expresses the face components such as eyes, nose, mouth, eye brows, hair and face contour in lines. For example, the component image creating section 5g creates the face detail image by a process using AAM (Active Appearance Model) as the detail extraction process.

Here, AAM is a method of modeling visual events and is a process for modeling an arbitrary image of a face region. For example, the component image creating section 5g registers the statistical analysis results of the positions and pixel values (for example, brightness values) of a predetermined feature points (for example, tail of eyes, tip of a nose, face line and the like) in a plurality of sample face images in a predetermined registration unit. Then, the component image creating section 5g simulates the image of the face region (the face region image) by using various types of models which are set by the position of the above feature points being the references, that is, by using the shape model expressing the shapes of the face and the texture model expressing the "Appearance" in the average shapes. Thus, the component image creating section 5g creates a face detail image wherein the main components in the original image P1 are extracted and expressed in lines.

Further, the component image creating section 5g creates a face component image in which the face components that exist inside the face contour in the face region and the face components that contact the contour in lines. In particular, the component image creating section 5g specifies the pixels in the face detail image that contact the face contour and deletes the pixel groups which are outside the face contour among the pixels that are continuous from the specified pixels. That is, the component image creating section 5g deletes the parts outside of the face contour in the face detail images and maintains the parts that are inside the face contour and that contact the contour to generate the face component image including the part images of the main face components such as eyes, a nose, a mouth, eye brows and the like.

Here, as the detail extraction process, the process using AAM is exemplified. However, this process is an example and is not limitative in any way, and the process can be modified arbitrarily.

The portrait image creating section 5h generates a portrait image by using the face component image.

That is, the portrait image creating section 5h creates a portrait image (not shown in the drawings) of the original image P1 by using the face component image generated by the component image creating section 5g. In particular, the portrait image creating section 5h specifies the positions to superimpose the part images of face components such as eyes, nose, mouth and eye brows, for example, inside the face contour of a predetermined hair style image and superimposes the part images of the face components on the specified positions to create image data of a portrait image which expresses the original image P1 in a portrait style.

The portrait image creating section 5h may create an image by applying predetermined colors to predetermined parts (for example, to the face components such as eyes, a mouth and eye brows) in the portrait image.

The recording medium control unit 6 is configured so that the recording medium M can be attached and detached freely. The recording medium control unit 6 controls data reading from the inserted recording medium M and data writing into the recording medium M.

That is, the recording medium control unit 6 records the image data which is encoded into a predetermined compression format (for example, JPEG format) by the encoding section (not shown in the drawings) in the image processing unit 5 in the recording medium M.

Here, the recording medium M is configured of a non-volatile memory (flash memory), for example. However, this is an example and is not limitative in any way. The recording medium can be modified arbitrarily.

The display control unit 7 controls the reading of the image data for display which is temporarily stored in the memory 4 and the displaying of the image data in the display unit 8.

In particular, the display control unit 7 includes a VRAM (Video Random Access Memory), a VRAM controller, a digital video encoder and such like. The digital video encoder reads out the brightness signal Y and the color difference signals Cb and Cr which are read out from the memory 4 and stored in the VRAM (not shown in the drawings) under the control of the central control unit 10 from the VRAM via the VRAM controller regularly, generates a video signal based on the read data and outputs the generated video signals to the display unit 8.

The display unit 8 is a liquid crystal display panel, for example, and displays an image which is captured by the image capturing unit 1 in the display screen based according to the video signals from the display control unit 7. In particular, the display unit 8, in the still image capturing mode or in the video image capturing mode, displays live view images sequentially updating a plurality of frame images, which are generated by the image capturing unit 1 and the image capturing control unit 2 capturing images of a specific subject, at a predetermined frame rate. Further, the display unit 8 displays images (rec-view images) which are recorded as still images and also displays images which are being recorded as video images.

The operation input unit 9 is for performing predetermined operation of the image capturing apparatus 100. In particular, the operation input unit 9 includes operation sections such as a shutter button relating to the instruction to capture an image of a subject, a selection OK button relating to the instruction to select the image pickup mode, a function and the like and a zoom-in button relating to the instruction to adjust the zooming (all of them are not shown in the drawings). The operation input unit 9 outputs a predetermined operation signal according to an operation of each button of the operation sections to the central control unit 19.

The central control unit 10 controls each unit in the image capturing apparatus 100. In particular, the central control unit 10 includes a CPU (Central Processing Unit) (not shown in the drawings), for example. The central control unit 10 performs various control operations according to various processing programs (not shown in the drawings) for the image capturing apparatus 100.

Next, the portrait image generation process performed in the image capturing apparatus 100 will be described with reference to FIGS. 2 to 7.

Figure 2:
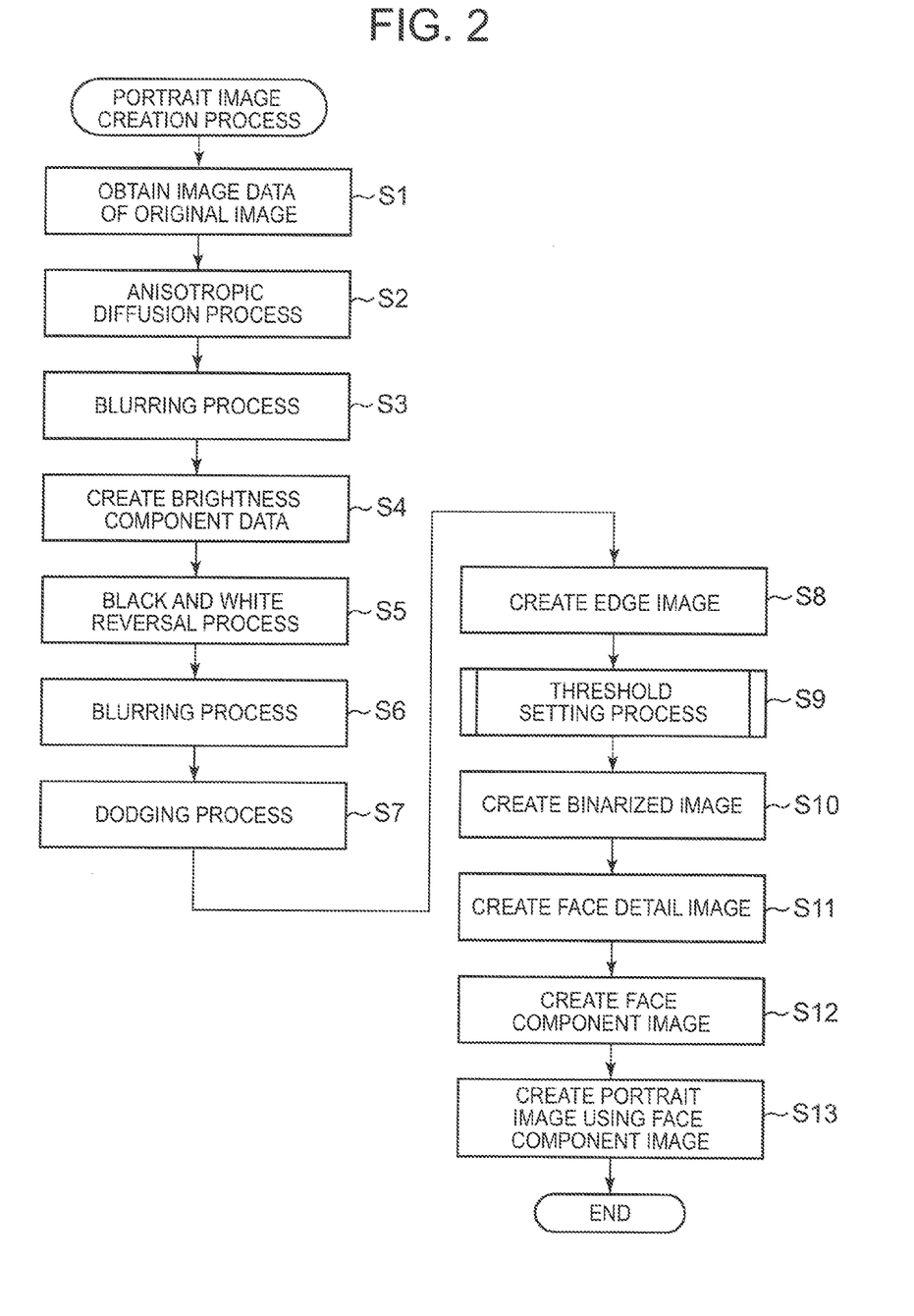
FIG. 2 is a flowchart which shows an example of the operation of the portrait image creating process performed by the image capturing apparatus of FIG. 1.

FIG. 2 is a flowchart showing an example of an operation according to the portrait image creating process.

The portrait image creating process is a process which is performed by each unit in the image capturing apparatus 100, especially by the image processing unit 5, under the control of the central control unit 10 in a case where the portrait image creating mode is selected in a plurality of operation modes which are displayed in the menu screen based on the predetermined operation performed by a user on the selection OK button in the operation input unit 9.

The image data of the original image P1 which is to be the processing target of the portrait image generation process is assumed as being recorded in the recording medium M in advance.

As shown in FIG. 2, first, the recording medium control unit 6 reads out the image data of the original image P1 (see FIG. 4A) which is specified based on the predetermined operation performed by a user in the operation input unit 9 among the image data recorded in the recording medium M and then, the image obtaining section 5a in the image processing unit 5 obtains the read image data as the processing target of the portrait image creating process (step S1).

Next, the image processing unit 5 performs the anisotropic diffusion process on the image data of the original image P1, the weights in the tangential direction and the vertical direction of the edge are made to be different and smoothened by using a predetermined anisotropic diffusion filter in the in the anisotropic diffusion process (step S2). Thereafter, the image processing unit 5 performs the blurring process on the image data on which the anisotropic diffusion process is performed by using the Gaussian filter whose arithmetic processing range of one pixel is a predetermined size (for example, 3×3 pixel) (step S3).

Here, the anisotropic diffusion process and the blurring process are well known techniques; therefore, their detail descriptions are omitted.

Figure 4B:
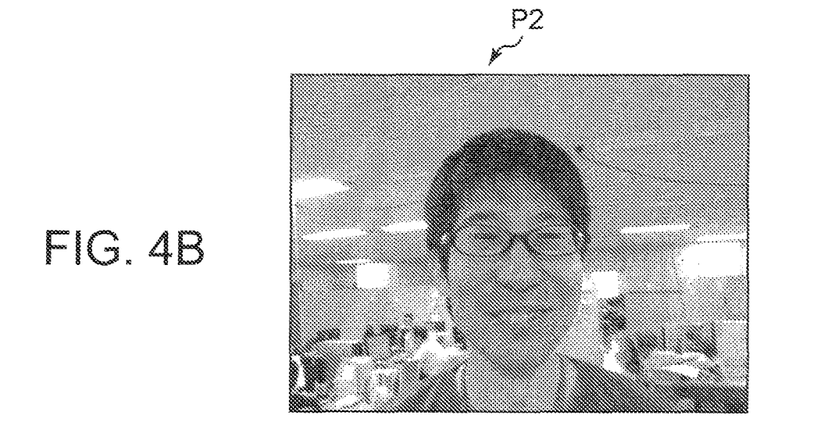
FIG. 4B is a schematic diagram showing an example of an image according to the threshold setting process of FIG. 3.

The image processing unit 5 creates image data of the intensity image P2 (brightness component data) by dividing the image data on which the blurring process is performed into the brightness component and the color difference component (step S4; see FIG. 4B). Here, the image processing unit 5 creates a copy of the image data of the intensity image P2 and stores the copy in a predetermined storage unit (for example, the memory 4).

Figure 4C:
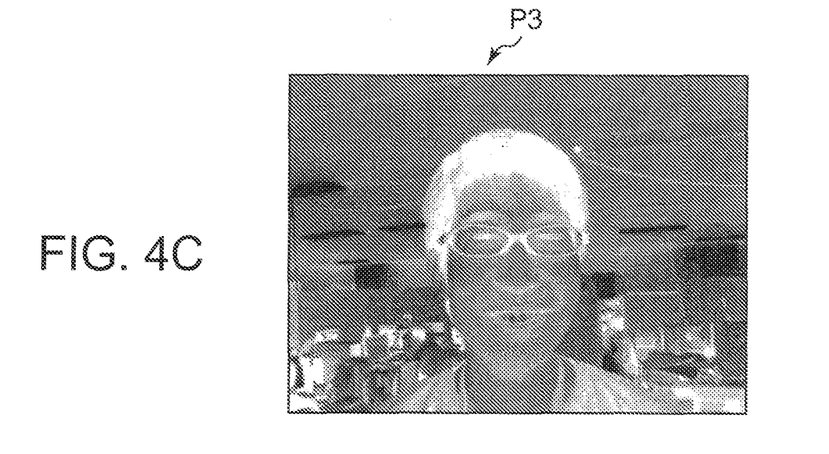
FIG. 4C is a schematic diagram showing an example of an image according to the threshold setting process of FIG. 3.

Next, the image processing unit 5 performs the black and white reversal process by which the brightness of the image data of the intensity image P2 is reversed (negative-positive conversion) and creates image data of the black and white reversed image P3 (step S5; see FIG. 4C).

Here, the black and white reversal process is a well known technique; therefore, the detail description thereof is omitted.

Thereafter, the image processing unit 5 performs the blurring process on the image data of the black and white reversed image P3 by using the Gaussian filter whose arithmetic processing range of one pixel is a predetermined size (for example, 7×7 pixel) (step S6). Here, the image processing unit 5 creates a copy of the image data on which the blurring process is performed and stores the copy in a predetermined storage unit (for example, the memory 4).

Then, the image processing unit 5 performs the dodging process by using the image data on which the blurring process is performed and the image data of the intensity image P2 (step S7). Here, the dodging process is an image capturing method performed by partially changing the exposure time. However, approximately the same effect can be obtained by the image process using a predetermined dodging filter.

Figure 5A:
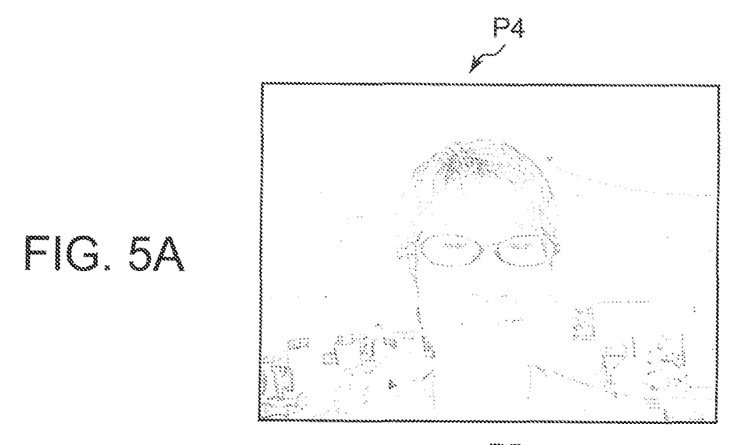
FIG. 5A is a schematic diagram showing an example of an image according to the threshold setting process of FIG. 3.
Figure 5B:
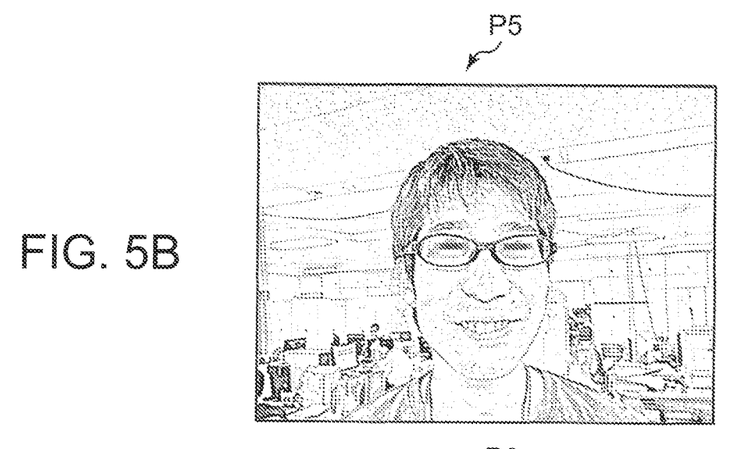
FIG. 5B is a schematic diagram showing an example of an image according to the threshold setting process of FIG. 3.
Figure 5C:
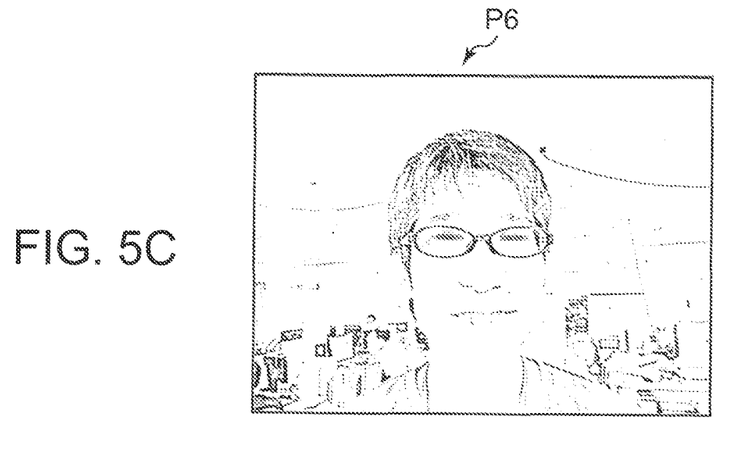
FIG. 5C is a schematic diagram showing an example of an image according to the threshold setting process of FIG. 3.

The image processing unit 5 creates the edge image P4 from the parts where the pixel values are different between the image data on which the dodging process is performed and the image data on which the blurring process is performed, that is, the blurred part (step S8; see FIG. 5A).

The process of creating the edge image P4 by using the dodging process is a well known technique; therefore, the detail description thereof is omitted.

Next, the image processing unit 5 performs the threshold setting process (see FIG. 3) (Step S9).

Figure 3:
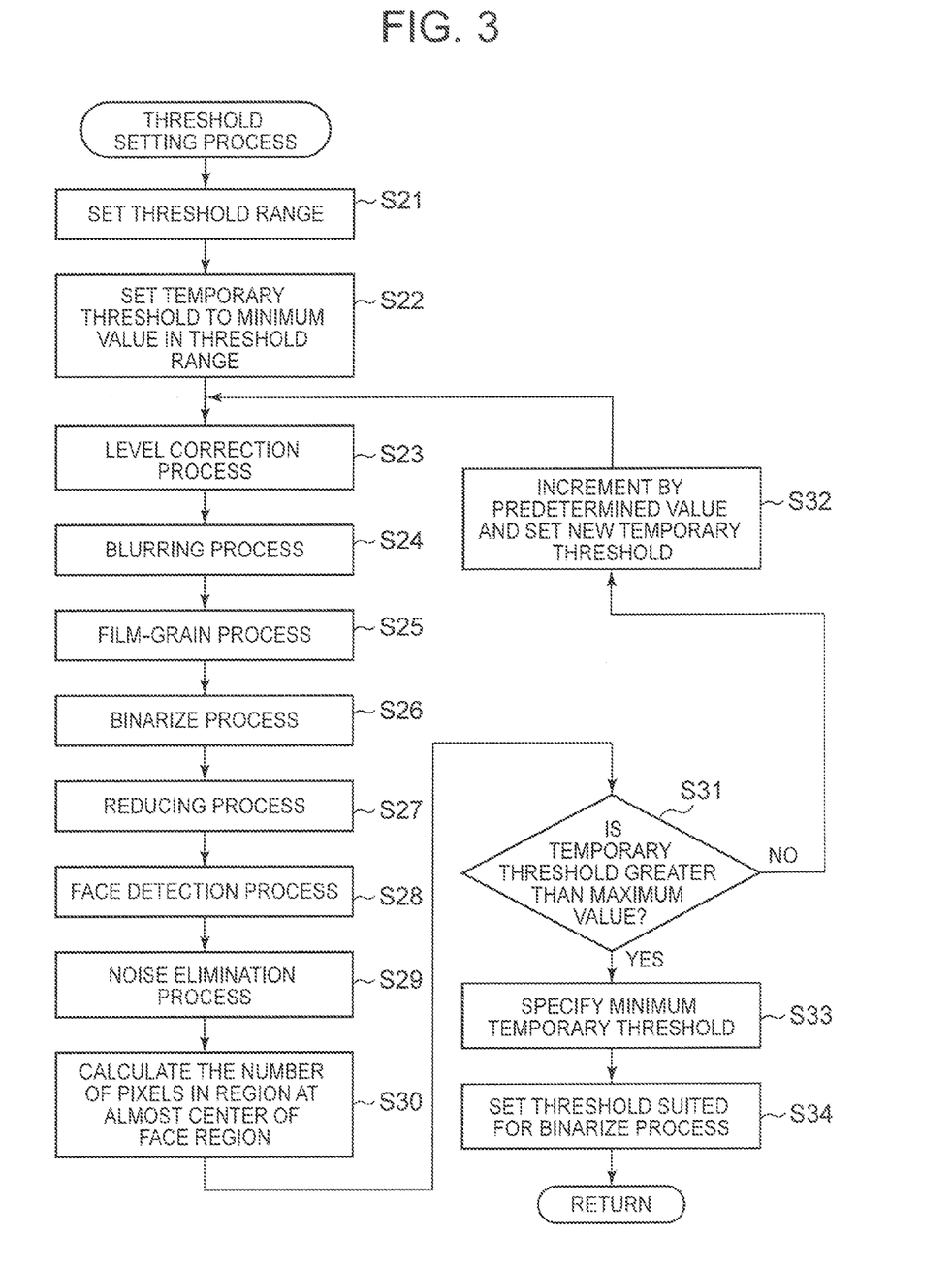
FIG. 3 is a flowchart showing an example of the operation of the threshold setting process in the portrait image generation process of FIG. 2.

Hereinafter, the threshold setting process will be described with reference to FIG. 3. FIG. 3 is a flowchart showing an example of an operation according to the threshold setting process.

As shown in FIG. 3, the binarize processing section 5b of the image processing unit 5 sets the threshold range for setting the temporary threshold to a predetermined range (for example, "231" to "255" with 8 bit) (step S21), and thereafter, sets the minimum value (for example, "231") within the threshold range as the temporary threshold (step S22).

Next, the image processing unit 5 performs the level correction process on the edge image P4 (step S23). In particular, the image processing unit 5 performs a process to convert the range from the temporary threshold (for example "231") of the edge image P4 to "255" into a range of 8 bit ("0" to "255").

Thereafter, the image processing unit 5 performs the blurring process on the image data of the image P5 (see FIG. 5B) on which the level correction process is performed by using the Gaussian filter whose arithmetic processing range of one pixel is a predetermined size (for example, 3×3 pixel) (step S24).

Thereafter, the image processing unit 5 performs the film-grain process on the image data on which the blurring process is performed, pixels whose brightness values are a predetermined value or more, that is, uncleanliness of the face and the like being eliminated by using a predetermined film-grain filter in the film-grain process (step S25).

Next, the binarize processing section 5b performs the binarize process on the image data of the image P6 (see FIG. 5C) on which the film-grain process is performed with the temporary threshold (for example "231") and creates the image data of the binarized image P7 wherein the white pixels are "0" and the black pixels are "255" (step S26). Here, the binarize processing section 5b creates a copy of the image data of the binarized image P7 and stores the copy in a predetermined storage unit (for example, the memory 4).

Thereafter, the image processing unit 5 performes the reducing process on the image data of the binarized image P7 so as to be ½ horizontally and vertically (step S27).

The evaluation value calculation section 5c performs the face detection process on the image data of the binarized image P7 which is reduced by using a predetermined algorithm (for example, adaboost) and calculates the evaluation value relating to likeness to the face of a person (step S28). Then, the evaluation value calculation section 5c temporarily stores the calculated evaluation value in the evaluation value table T in a predetermined storage unit so as to be associated with the temporary threshold (see FIG. 6).

Next, the image processing unit 5 performs the noise elimination process on the binarized image P7 of before the reducing, the group of black pixels of a predetermined number or less (for example "50" pixels) is eliminated as noise (step S29). Thereafter, the number of pixels calculation section 5e sets the processing region at the approximately center of the face region by setting the image on which the noise elimination process is performed as the processing target and calculates the number of black pixels in the processing region (step S30). Then, the number of pixels calculation section 5e temporarily stores the calculated number of black pixels in a predetermined storage unit.

Next, the image processing unit 5 determine whether the temporary threshold exceeds the maximum value in the threshold range (step S31).

Here, if it is determined that the temporary threshold does not exceed the maximum value (step S31; NO), the binarize processing section 5b sets a new temporary threshold (for example, "233") by incrementing the value of the temporary threshold by a predetermined value (for example, "+2") (step S32) and the process proceeds to step S23.

Thereafter, by the processes of steps S23 to S29 being performed by using the newly set temporary threshold, the evaluation value for face detection is calculated in step S28 and the number of black pixels in the processing region is calculated in step S30.

The above processes are sequentially repeated until it is determined that the temporary threshold exceeds the maximum value within the threshold range in step S31 (step S31; YES). That is, the temporary thresholds are sequentially set within the threshold range (for example, "231" to "255"), and the evaluation value of face detection and the number of black pixels in the processing region corresponding to each temporary threshold are calculated.

If it is determined that the temporary threshold exceeds the maximum value in step S31 (step S31; YES), the threshold specifying section 5d specifies the evaluation values of approximately the same value that continue for a predetermined number of times or more by referring to the evaluation value table T (for example "100") and specifies the minimum temporary threshold (for example, "245") among the plurality of temporary thresholds (for example, "245", "247", "294", "251", "253") associated with the specified evaluation values (step S33).

Next, the threshold setting section 5f sets the threshold suited for the binarize process of the original image P1 (step S34). In particular, the threshold setting section 5f reduces the threshold by a predetermined value (for example, about "8") with the minimum temporary threshold (for example, "245") being the reference and determines whether the number of black pixels in the processing region at the approximately center of the face region in the binarized image P7 which is binarized with this temporary threshold is within a predetermined range (for example, about 3000 to 5000). If it is determined that the number of black pixels in the processing region is within the predetermined range, the threshold setting section 5f sets this temporary threshold as the threshold suited for the binarize process of the original image P1, and on the other hand, if the number of black pixels in the processing region is not in the predetermined range, the threshold setting section 5f sets the predetermined temporary threshold (for example "231") as the threshold suited for the binarize process of the original image P1.

Hereby, the threshold setting process ends.

Turning to FIG. 2, the binarize processing section 5b performs the binarize process on the original image P1 which is obtained by the image obtaining section 5a with the threshold set by the threshold setting process and creates a binarized image P7 (for example, the binarized image P7b) (step S10).

Next, the component image creating section 5g performs the detail extraction process (for example, a process using AAM) with respect to the face region detected in the binarized image P7 and creates the face detail image in which the face components (for example, eyes, nose, mouth, eye brows, hair and face contour) are expressed in lines (step S11). Thereafter, the component image creating section 5g specifies the face contour in the face region by the detail extraction process and creates a face component image including the face components inside the face contour and the face components contacting the contour, that are, part images of the main face components such as eyes, nose, mouth and eye brows, for example (step S12).

Further, the portrait image creating section 5h creates a portrait image of the original image P1 by using the face component image (step S13). In particular, the portrait image creating section 5h obtains a predetermined hair style image and specifies the positions inside the face contour of the hairstyle image where the parts images of the face components, such as eyes, nose, mouth and eye brows, are to be superimposed. Then, the portrait image creating section 5h superimposes the part images of the face components onto the positions to create image data of a portrait image that expresses the original image P1 in a portrait style.

Then, the recording medium control unit 6 obtains and records the image data (YUV data) of the portrait image created by the portrait image creating section 5h.

Hereby, the portrait image creation processing ends.

As described above, according to the image capturing unit 100 of the embodiment, the subject detection process (for example, a face detection process) for detecting a specific subject (for example, the face of a person) is performed with respect to each of the plurality of binarized images P7 which are created by the binarize process being performed on the original image P1 with a plurality of temporary thresholds which are different from each other, a plurality of evaluation values relating to likeness to the specific subject are calculated in association with the temporary thresholds, and the threshold suited for the binarize process of the original image P1 is set based on the plurality of evaluation values. Therefore, the plurality of evaluation values can be calculated by using the plurality of temporary thresholds in advance and the setting of the threshold suited for the binarize process can be carried out appropriately by using the plurality of evaluation values.

In particular, the threshold suited for the binarize process of the original image P1 is set based on the minimum temporary threshold among the plurality of temporary thresholds associated with the plurality of evaluation values which are approximately the same value that continue for a predetermined number of times or more. Therefore, the temporary threshold associated with the evaluation value which is higher than the evaluation value associated with the minimum temporary threshold by a predetermined value or more can be set as the threshold suited for the binarize process of the original image P1. Therefore, the threshold can be reduces by the predetermined value with the minimum temporary threshold being the reference. Thereby, for example, even if the number of black pixels in the face region is greater than usual as in the case where a person is wearing a pair of dark rimmed glasses, the threshold suited for the binarize process of the original image P1, the threshold enabling the appropriate binarizing of the face image itself, can be set appropriately.

The threshold suited for the binarize processing of the original image P1 is set based on the minimum temporary threshold so that the number of pixels having predetermined pixel values in a region at the approximately center of the subject region including the specific subject detected in each of the plurality of binarized images P7 is within a predetermined range. Therefore, the threshold can be reduces by a predetermined value with the minimum temporary threshold being the reference so that the pixels having predetermined pixel values do not disproportionately exist in the region at the approximately center of the subject region, and the threshold which can appropriately binarize the face image itself can be set appropriately.

Further, the face component image relating to the main components of the face in the original image P1 is created by using the binarized image P7 which is created by the binarize process being performed on the original image P1 with the set threshold and the portrait image of the original image P1 is created by using the face component image. Therefore, a portrait image can be created appropriately by using the binarized image P7 which is created by the binarized process being performed on the face image itself with the threshold that allows the face image to be binarized appropriately.

The present invention is not limited to the above described embodiment, and various modifications and design changes can be carried out within the scope of the present invention.

For example, in the above embodiment, the face component image relating to the main components of the face in the original image P1 is created and the portrait image is created by using the face component image. However, there is no need for the face component image and the portrait image to be created, and whether the face component image and the portrait image are to be created or not can be changed arbitrarily. That is, the threshold setting process performed by the image capturing apparatus 100 according to the above embodiment may be applied to the mere binarize process of a predetermined image data.

Further, the configuration includes the recording medium control unit 6 to record the original image P1. However, the configuration is not limited to this. For example, the configuration may be such that the original image P1 is recorded in a predetermined server which is connectable with the apparatus main body via a predetermined communication network, and the image obtaining section 5a obtains the original image P1 from the server by accessing the predetermined server by a communication processing unit (not shown in the drawings) via a communication network.

The configuration of the image capturing apparatus 100 exemplified in the above described embodiment is an example, and the configuration is not limited in any way. Although the image capturing apparatus 100 is exemplified as the threshold setting device, the threshold setting device is not limited to this. The threshold setting device may be of any configuration as long as the threshold setting process according to the present invention can be executed.

In the above embodiment, the functions as the ways for creation, subject detection, evaluation value calculation and setting may be realized by predetermined programs and the like being executed by the central control unit 10.

That is, in the program memory (not shown in the drawings) that stores programs, programs including the creation process routine, the subject detection process routine, the evaluation value calculation process routine and the setting process routine are stored. The creation process routine may make the CPU of the central control unit 10 function as a unit for creating a plurality of images of plurality of tones by performing the tone conversion process using the plurality of temporary threshold which are different from each other with respect the original image P1 including the subject. Further, the subject detection process routine may make the CPU of the central control unit 10 function as a unit for detecting the subject in each of the plurality of created images of tones. Moreover, the evaluation value calculation process routine may make the CPU of the central control unit 10 function as a unit for calculating the evaluation value relating to likeness to the subject for each of the plurality of detected subjects and associating the calculated evaluation value with the temporary threshold. Further, the evaluation value calculation process routine may make the CPU of the central control unit 10 function as a unit for setting the threshold suited for the tone conversion process of the original image P1 based on the plurality of calculated evaluation values.

Similarly, the ways of specifying, number of pixel calculation, the first creating (the component image creating section 5g) and the second creating (the portrait image creating section 5h) may also be realized by the CPU of the central control unit 10 executing predetermined programs, for example.

As a computer readable medium in which programs for executing the above processes are stored, a non-volatile memory such as a flash memory and a portable recording medium such as a CD-ROM may be applied in addition to a ROM, hard disk and the like. Further, as a medium for providing data of programs via a predetermined communication circuit, a carrier wave can be applied.

Few embodiments of the present invention are described above. However, the scope of the present invention is not limited to the embodiments, but includes the scope of the invention recited in the claims and equivalents thereof.

The entire disclosure of Japanese Patent Application NO. 2012-250946 filed on Nov. 15, 2012 including description, claims, drawings, and abstract is incorporated herein by reference in its entirety.

What is claimed is:

1. A threshold setting apparatus, comprising:
a processor which is operable as:
a creating unit which creates a plurality of images of tones by performing a tone conversion process on an original image including a subject by using a plurality of temporary thresholds which are different from each other;

a subject detection unit which detects the subject in each of the plurality of images of tones which are created by the creating unit;

an evaluation value calculating unit which calculates evaluation values relating to likeness to the subject from the plurality of subjects detected by the subject detection unit and associates the evaluation values with the temporary thresholds; and a setting unit which sets a threshold suited for the tone conversion of the original image based on the plurality of evaluation values calculated by the evaluation value calculating unit.

2. The threshold setting apparatus as claimed in claim 1, wherein the creating unit performs a binarize process on the original image with the plurality of temporary thresholds and creates a plurality of binarized images.

3. The threshold setting apparatus as claimed in claim 2, wherein the processor is further operable as:

a specifying unit which specifies a minimum temporary threshold among the plurality of temporary thresholds associated with the plurality of evaluation values calculated by the evaluation value calculating unit, wherein the creating unit further performs the binarize process on the original image with the temporary thresholds of a series which vary in increments of a predetermined value, and the setting unit sets the threshold suited for the binarize process of the original image based on the minimum temporary threshold specified by the specifying unit.

4. The threshold setting apparatus as claimed in claim 3, wherein the setting unit further sets a temporary threshold associated with an evaluation value which is higher than an evaluation value associated with the minimum temporary threshold specified by the specifying unit by a predetermined value or more as the threshold suited for the binarize process of the original image.

5. The threshold setting apparatus as claimed in claim 4, wherein the processor is further operable as:

a number of pixels calculating unit which calculates a number of pixels having predetermined pixel values in a region at an approximate center of a subject region including the subject detected by the subject detection unit in each of the plurality of binarized images, wherein the setting unit sets the threshold suited for the binarize process of the original image based on the minimum temporary threshold specified by the specifying unit such that the number of pixels calculated by the number of pixels calculating unit is within a predetermined range.

6. The threshold setting apparatus as claimed in claim 1, wherein the subject includes a face of a person.

7. The threshold setting apparatus as claimed in claim 6, wherein the processor is further operable as:

a first creating unit which creates a face component image relating to main components of the face in the original image by using a binarized image which is created by the binarize process being performed on the original image with the threshold set by the setting unit; and a second creating unit which creates a portrait image of the original image by using the face component image created by the first creating unit.

8. A threshold setting method performable by a processor of a threshold setting apparatus, the method comprising:

creating a plurality of images of tones by performing a tone conversion process on an original image including a subject by using a plurality of temporary thresholds which are different from each other;

detecting the subject in each of the plurality of created images of tones;

calculating evaluation values relating to likeness to the subject from the plurality of detected subjects and associating the evaluation values with the temporary thresholds; and setting a threshold suited for the tone conversion of the original image based on the plurality of calculated evaluation values.

9. A non-transitory computer readable recording medium having a program stored thereon that can be read by a computer in a threshold setting apparatus, the program making the computer function as:

a creating unit which creates a plurality of images of tones by performing a tone conversion process on an original image including a subject by using a plurality of temporary thresholds which are different from each other;

a subject detection unit which detects the subject in each of the plurality of images of tones which are created by the creating unit;

an evaluation value calculating unit which calculates evaluation values relating to likeness to the subject from the plurality of subjects detected by the subject detection unit and associates the evaluation values with the temporary thresholds; and a setting unit which sets a threshold suited for the tone conversion of the original image based on the plurality of evaluation values calculated by the evaluation value calculating unit.

* * * * *